United States Patent
Dudar et al.

(10) Patent No.: US 9,724,736 B2
(45) Date of Patent: Aug. 8, 2017

(54) CAPLESS REFUELING SYSTEM CLEANING USING ENGINE VACUUM

(71) Applicant: Ford Global Technologies, LLC, Dearborn, MI (US)

(72) Inventors: Aed M. Dudar, Canton, MI (US); Robert Roy Jentz, Westland, MI (US); Scott A. Bohr, Novi, MI (US); Russell Randall Pearce, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/966,861

(22) Filed: Dec. 11, 2015

(65) Prior Publication Data

US 2016/0096427 A1 Apr. 7, 2016

Related U.S. Application Data

(63) Continuation of application No. 13/761,062, filed on Feb. 6, 2013, now Pat. No. 9,217,402.

(51) Int. Cl.
| | |
|---|---|
| *B08B 5/04* | (2006.01) |
| *F02M 35/10* | (2006.01) |
| *F02M 25/08* | (2006.01) |
| *B60K 15/04* | (2006.01) |
| *G01M 3/26* | (2006.01) |
| *F02D 19/06* | (2006.01) |
| *B60K 15/035* | (2006.01) |

(52) U.S. Cl.
CPC .......... *B08B 5/04* (2013.01); *B60K 15/03504* (2013.01); *B60K 15/03519* (2013.01); *B60K 15/04* (2013.01); *B60K 15/0406* (2013.01); *F02M 25/089* (2013.01); *F02M 25/0809* (2013.01); *F02M 25/0836* (2013.01); *F02M 25/0854* (2013.01); *F02M 35/10229* (2013.01); *G01M 3/26* (2013.01); *B60K 2015/03514* (2013.01); *B60K 2015/03561* (2013.01); *B60K 2015/0429* (2013.01); *F02D 19/0623* (2013.01); *F02D 19/0628* (2013.01); *Y10T 137/0419* (2015.04)

(58) Field of Classification Search
CPC .. B08B 5/04; F02M 25/0809; F02M 25/0836; F02M 25/0854; F02M 35/10229; F02D 19/0628; F02D 19/0623
USPC ...................... 123/518, 516, 519, 520, 198 D
See application file for complete search history.

(56) References Cited

U.S. PATENT DOCUMENTS

| | | |
|---|---|---|
| 5,056,570 A | 10/1991 | Harris et al. |
| 5,259,412 A | 11/1993 | Scott et al. |
| 5,451,927 A | 9/1995 | Thompson |
| 5,570,672 A | 11/1996 | Kunimitsu et al. |
| 6,009,920 A | 1/2000 | Palvoelgyi et al. |
| 6,253,802 B1 | 7/2001 | Enge |
| 6,269,803 B1 * | 8/2001 | Corkill ............... F02M 25/0809 123/520 |
| 6,854,492 B2 | 2/2005 | Benjey |
| 6,923,224 B1 | 8/2005 | McClung et al. |
| 7,086,392 B2 | 8/2006 | Suzuki |

(Continued)

*Primary Examiner* — Mahmoud Gimie
(74) *Attorney, Agent, or Firm* — James Dottavio; McCoy Russell LLP

(57) ABSTRACT

Methods and systems for cleaning a capless refueling system in a vehicle are disclosed. In one example approach, a method comprises, in response to a leak detected following a refueling event, cleaning the capless refueling system using engine vacuum.

16 Claims, 4 Drawing Sheets

(56) References Cited

U.S. PATENT DOCUMENTS

| | | |
|---|---|---|
| 7,163,037 B2 | 1/2007 | Walkowski |
| 2002/0092487 A1 | 7/2002 | Stockhausen et al. |
| 2003/0140970 A1* | 7/2003 | Benjey ............. B60K 15/03504 137/587 |
| 2006/0162813 A1* | 7/2006 | Walkowski ........ B60K 15/0406 141/350 |
| 2009/0056829 A1 | 3/2009 | Aitken et al. |

* cited by examiner

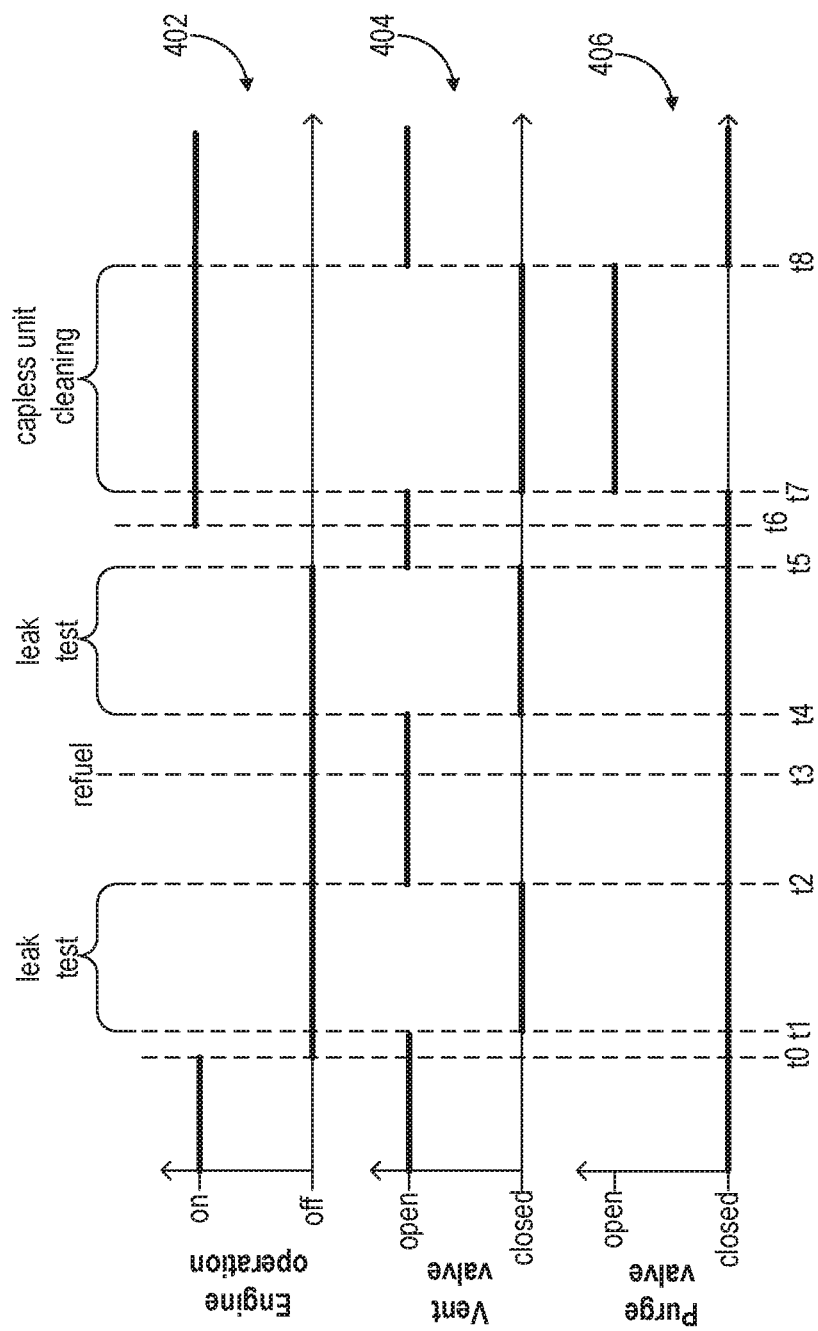

CAPLESS REFUELING SYSTEM CLEANING USING ENGINE VACUUM

CROSS REFERENCE TO RELATED APPLICATION

The present application is a continuation of U.S. patent application Ser. No. 13/761,062, entitled "CAPLESS REFUELING SYSTEM CLEANING USING ENGINE VACUUM," filed on Feb. 6, 2013, the entire contents of which are hereby incorporated by reference for all purposes.

BACKGROUND/SUMMARY

Fuel systems for engines, e.g., diesel or petrol/gasoline engines, may include capless fuel filler necks on a fuel filler pipe coupled to a fuel tank for replenishing fuel in the tank. Such capless fuel filler necks may include sealing doors or flaps which remain closed to seal off the fuel system without a cap. A sealing door on a capless fuel filler neck may be opened by inserting a fuel nozzle into the fuel filler neck for refueling, for example. Capless refueling assemblies may be used in vehicles to reduce evaporative emissions as well as to simplify the refueling process.

Leak testing may be performed on fuel evaporative emissions systems to detect small leaks in order to reduce emissions. In some approaches, if a leak is detected following a refueling event for a vehicle with a capless refueling system, a message may be sent to the vehicle operator requesting that they manually clean out the capless refueling unit. For example, a refueling funnel may be packages onboard a vehicle with a capless refueling system, and in response to a leak detected after a refueling event, the vehicle operator may be instructed to manually clean the capless unit by inserting the funnel into the unit to clear dirt, salt, leaves, or other contaminants which may have entered the capless unit and thus caused the leak. If, after manually cleaning the capless unit, the leak is still present, then a diagnostic code may be set indicating degradation of the evaporative emission system.

However, the inventors herein have recognized that approaches which rely on manual cleaning of capless units when a leak is detected are intrusive and require a tool, e.g., a funnel, which may get misplaced. Further, such manual cleaning approaches may increase venting of fuel vapors into the atmosphere as the operator inserts the tool into the capless unit for cleaning.

In one example approach, in order to at least partially address these issues, a method for a vehicle with an engine and a capless refueling system comprises, in response to a leak detected following a refueling event, cleaning the capless refueling system using engine vacuum. For example, cleaning the capless refueling system using engine vacuum may be performed in response to no leak detected prior to the refueling event and a leak detected following the refueling event. Further, in some examples, if a leak is still detected after cleaning the capless refueling system using engine vacuum, a request may be sent to a vehicle operator to manually clean the capless refueling system.

In this way, engine vacuum may be used to clean debris introduced into a capless unit without relying on a manual, intrusive tool. Further, since engine vacuum is used in such an approach, fuel vapors may be kept inside the tank thus potentially reducing fuel emissions during the cleaning process.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIG. 4 shows engine operation graphs illustrating an example method for cleaning a capless refueling system using engine manifold vacuum.

DETAILED DESCRIPTION

Figure 1:
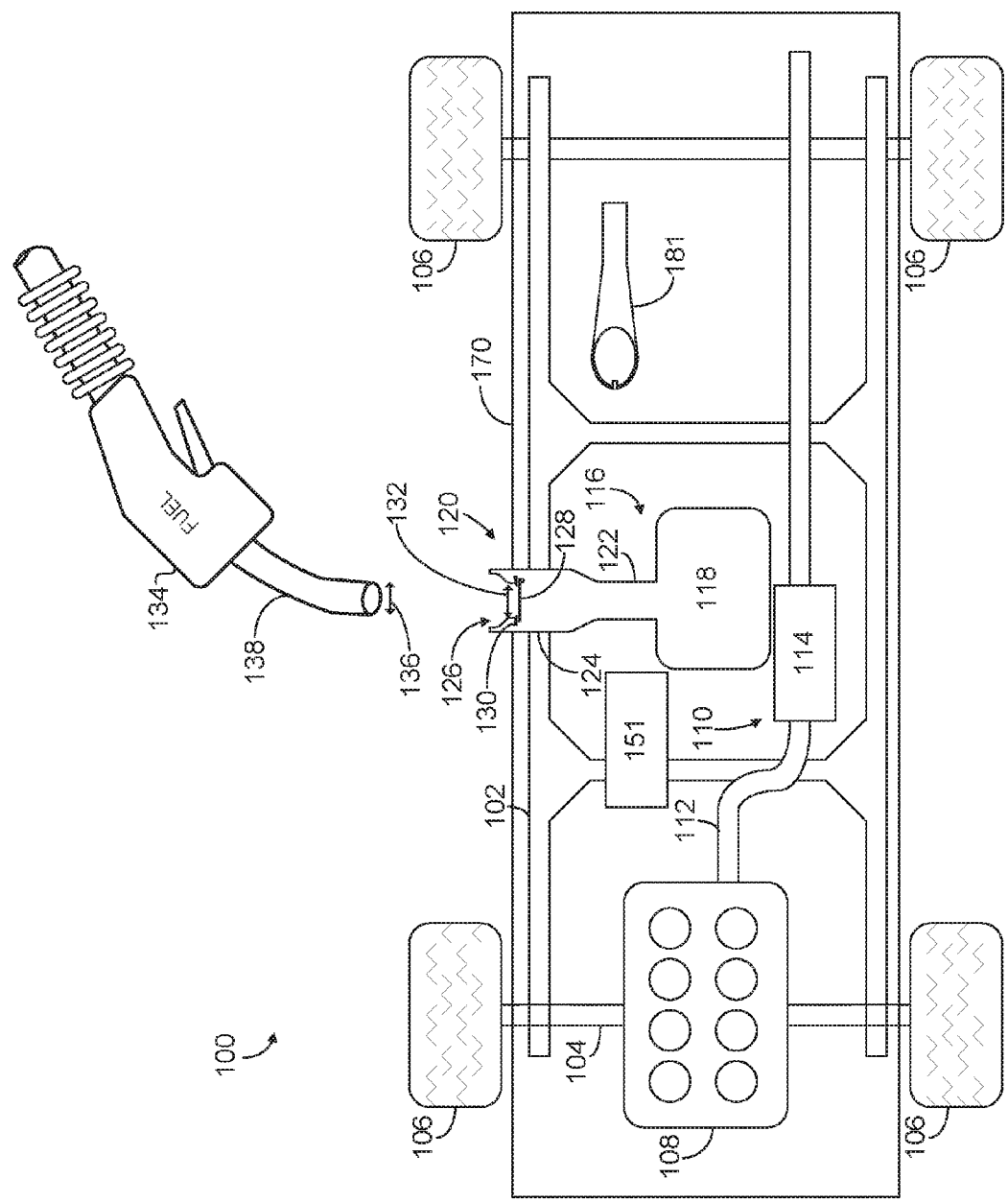
FIG. 1 shows a schematic depiction of an example vehicle system with a capless fuel filler system.
Figure 2:
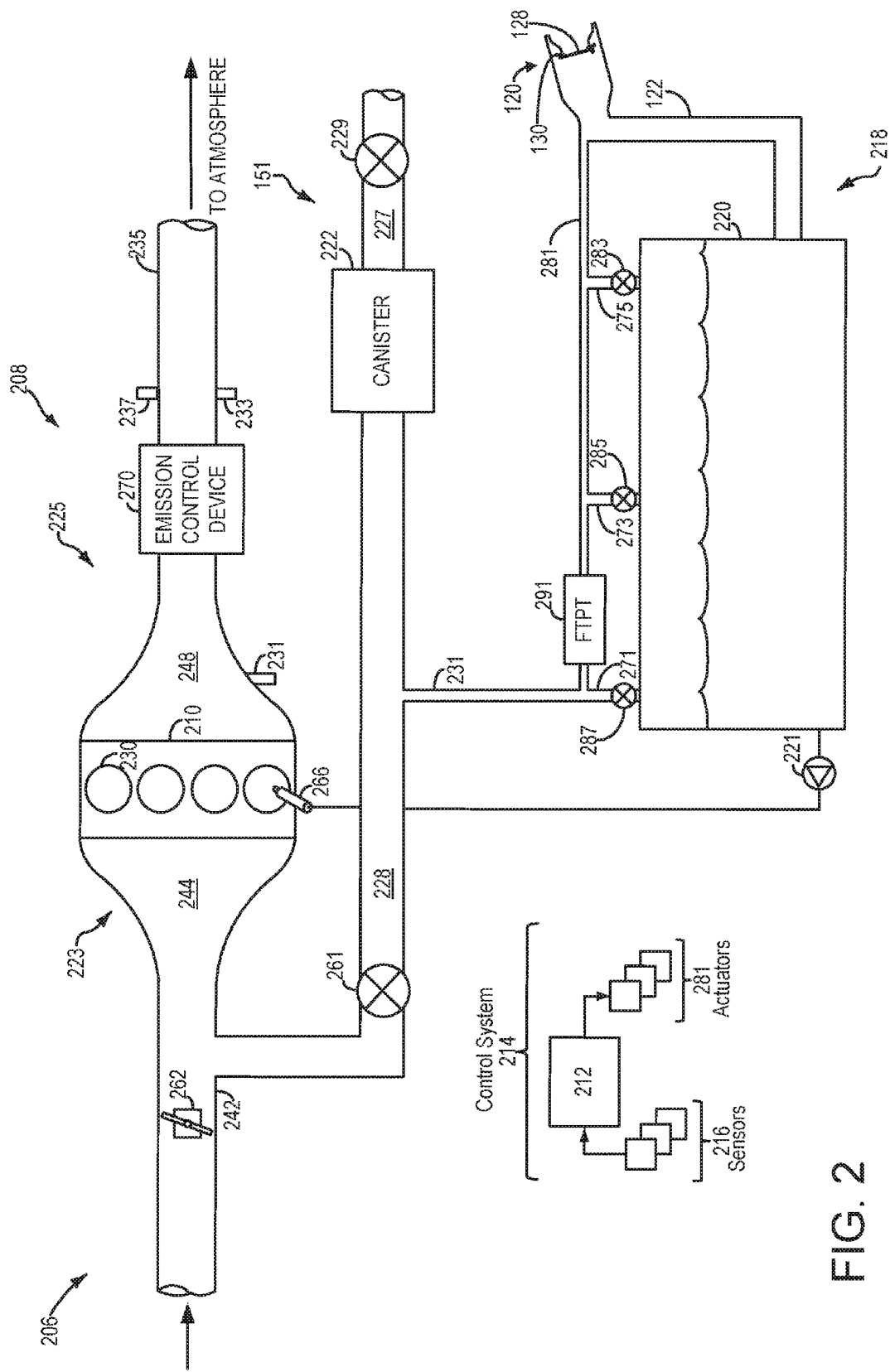
FIG. 2 shows an example vehicle system with a fuel emission control system.
Figure 3:
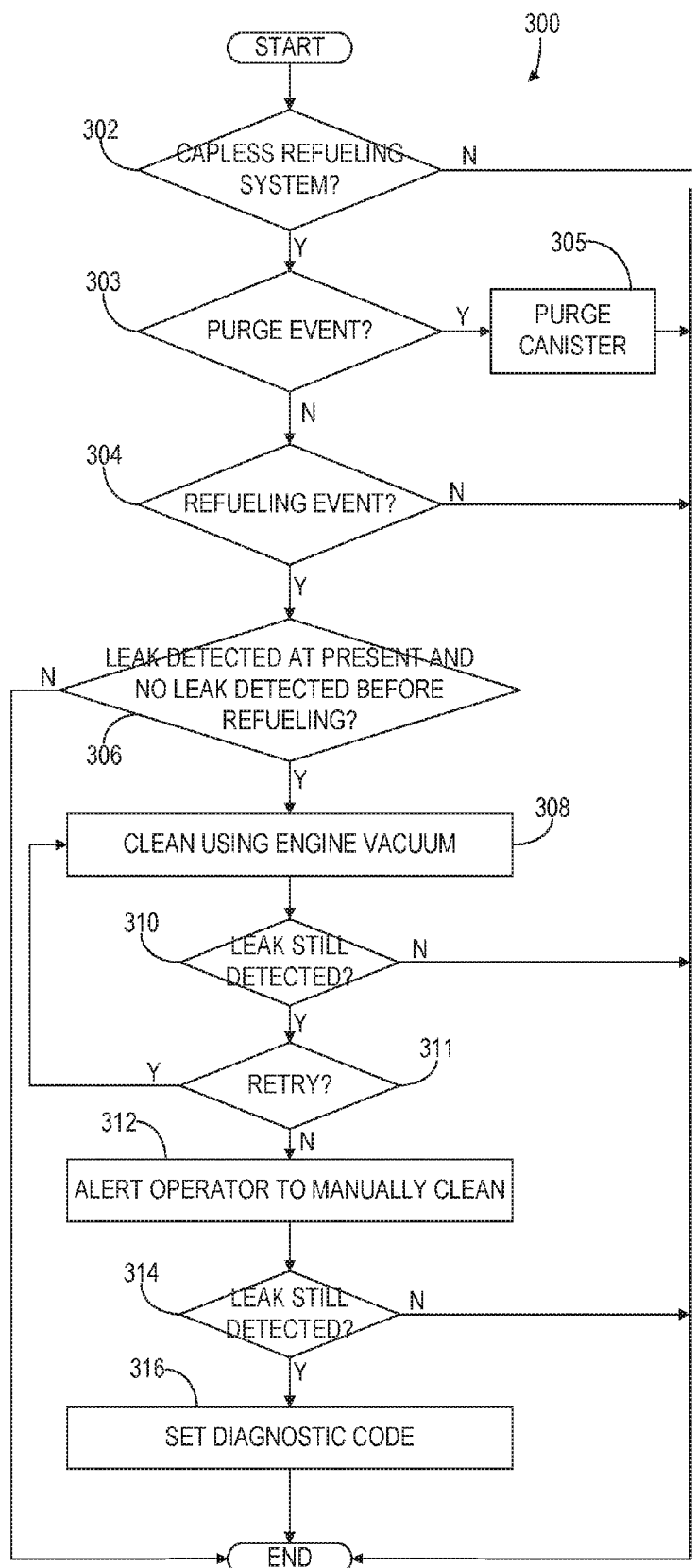
FIG. 3 shows an example method for cleaning a capless refueling system using engine manifold vacuum.

The following description relates to systems and methods for cleaning a capless refueling system in a vehicle, such as the example vehicles shown in FIGS. 1 and 2. As shown in FIG. 3 described below, if a leak is present in a capless refueling system following a refueling event, then contaminants may have been introduced into the capless unit during refueling and engine vacuum may be used to clean or dislodge the contaminants. In this way, engine vacuum may be used to clean debris introduced into the capless unit without relying on a manual, intrusive tool. Further, since engine vacuum is used in such an approach, fuel vapors may be kept inside the tank thus potentially reducing fuel emissions during the cleaning process.

Turning to FIG. 1, a schematic depiction of an example vehicle system is shown generally at 100. Vehicle 100 may include a chassis 102, an axle 104 with wheels 106, and an engine 108. The engine 108 may be a diesel engine in one example or a petrol or gasoline engine in other examples. Further, although not shown, vehicle 100 may further include a transmission, cab, or other components.

Vehicle 100 may further include an exhaust system 110. The exhaust system may include an exhaust conduit 112 leading to one or more exhaust aftertreatment devices, e.g., devices 114. Portions of the exhaust system, such as conduit 112, may be coupled to an exhaust manifold of engine 108 to that exhaust gas is supplied from the exhaust manifold to the conduit 112.

Vehicle 100 may further include a fuel system 116. Fuel system 116 may include one or more fuel storage tanks 118 for storing fuel on-board the vehicle. For example, fuel tank 118 may store one or more liquid fuels, including but not limited to: gasoline, diesel, alcohol fuels, or blends thereof. Fuel tank 118 may be coupled to engine 108 via a fuel delivery line (not shown) to deliver fuel to engine 108. Fuel system 116 may include a fuel evaporative emission control system 151 which may be used to control evaporative emissions from fuel system 116. An example, emission control system is described in more detail below with regard to FIG. 2

A fuel filler pipe 122 may be coupled to fuel tank 118 to direct fuel into fuel tank 118 during refueling. A capless fuel filler system 120 may be coupled to filler pipe 122. A capless fuel filler system may include a sealing element which remains closed to seal off the fuel system without a cap. A sealing element in a capless fuel filler system may be opened by inserting a fuel nozzle, such as nozzle 138 of fuel dispensing device 134, into the fuel filler neck 124 for refueling, for example. The capless fuel filler system 120 includes a capless fuel filler neck 124 including a sealing door or flap 128 held in place by one or more latches or seats 130 which remain closed to seal off the fuel system without a fuel cap. Fuel filler neck 124 may at least partially penetrate an outer surface 170 of vehicle 100 so that fuel may be replenished into the fuel tank via an external fuel source. For example, fuel may be replenished in fuel tank 118 via fuel dispensing device 134 at a refueling pump station.

When a fuel nozzle is inserted into the capless refueling system during refueling, contaminants such as dirt, salt, leaves, or other debris may be introduced into the capless unit so that the capless unit does not completely seal after removal of the nozzle. These contaminants may cause leaks in the emissions control system which may be detected during emission control leak detection routines. As described below with regard to FIG. 3, during some conditions, engine vacuum may be employed to assist in dislodging contaminants introduced into the capless unit in response to a leak detected after a refueling event.

In some examples, capless fuel filler system 120 may include a mis-fueling inhibitor 126. Mis-fueling inhibitor 126 may be sized to prevent incorrectly-sized fuel nozzles or spouts from opening the sealing door 128 in the capless fuel filler neck in order to reduce occurrences of mis-fueling. For example, in a diesel engine, a mis-fueling inhibitor may be configured to permit a standard-sized diesel fuel nozzle to open the capless filler neck and prevent a petrol fuel nozzle, which may be smaller than a diesel fuel nozzle, from opening the capless filler neck. As another example, in a petrol engine, a mis-fueling inhibitor may be configured to permit a standard-sized petrol fuel nozzle to open the capless filler neck and prevent a diesel fuel nozzle from opening the capless filler neck.

In some examples, vehicle 100 may include an onboard funnel 181 which may be used to refuel fuel tank 118 during conditions when a standard nozzle, such as nozzle 138 is not available. For example, funnel 181 may be packaged in vehicle 100 so that an operator may refuel fuel tank 118 using a non-standard fuel source, such as from a fuel container, etc. During some conditions, funnel 181 may be used to manually clean or clear the capless refueling system of debris when a leak is detected after a refueling event. For example, if a small leak is detected after a refueling event, a message may be sent to a vehicle operator, e.g., a message may be displayed on a display cluster, requesting that the operator use the provided funnel and insert it into the capless unit a few times to dislodge any contaminants that may be in the capless unit. If after manually cleaning the capless unit the leak is still there, then an indication may be sent to an onboard diagnostic system to report a degradation or leak in the capless unit or the emission control system so that maintenance may be performed. For example, one or more diagnostic codes may be set to indicate that a leak is present.

FIG. 2 shows another schematic depiction of a vehicle system 206. The vehicle system 206 includes an engine system 208 coupled to an emissions control system 151 and a fuel system 218. Emission control system 151 includes a fuel vapor canister 222 which may be used to capture and store fuel vapors.

The engine system 208 may include an engine 210 having a plurality of cylinders 230. The engine 210 includes an engine intake 223 and an engine exhaust 225. The engine intake 223 includes a throttle 262 fluidly coupled to the engine intake manifold 244 via an intake passage 242. The engine exhaust 225 includes an exhaust manifold 248 leading to an exhaust passage 235 that routes exhaust gas to the atmosphere. The engine exhaust 225 may include one or more emission control devices 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

Fuel system 218 may include a fuel tank 220 coupled to a fuel pump system 221. The fuel pump system 221 may include one or more pumps for pressurizing fuel delivered to the injectors of engine 210, such as the example injector 266 shown. While only a single injector 266 is shown, additional injectors are provided for each cylinder. It will be appreciated that fuel system 218 may be a return-less fuel system, a return fuel system, or various other types of fuel system.

Vapors generated in fuel system 218 may be routed to an emissions control system 151 which includes a fuel vapor canister 222 via vapor recovery line 231, before being purged to the engine intake 223. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, 275. Further, in some examples, one or more fuel tank isolation valves may be included in recovery line 231 or in conduits 271, 273, 275. Among other functions, fuel tank isolation valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to capless fuel filler system 120 so that, during certain conditions as described in more detail below, engine vacuum may be used to clean out debris or other blockages in the capless refueling system.

As described above, capless refueling system 120 is coupled to fuel tank 220 via a fuel filler pipe or neck 122 and may include a capless flap 128 and seat 130 to seal the capless unit when a fuel nozzle is not placed therein. However, as described in more detail below, during some conditions debris or other contaminants may be introduced into the capless unit during refueling and which may lead to leaks in the system.

A fuel tank pressure transducer (FTPT) 291, or fuel tank pressure sensor, may be included between the fuel tank 220 and fuel vapor canister 222, to provide an estimate of a fuel tank pressure, and for engine-off leak detection. The fuel tank pressure transducer may alternately be located in vapor recovery line 231, purge line 228, vent line 227, or other location within emission control system 151 without affecting its engine-off leak detection ability.

Emissions control system 151 may include one or more emissions control devices, such as one or more fuel vapor canisters 222 filled with an appropriate adsorbent, the canisters are configured to temporarily trap fuel vapors (including vaporized hydrocarbons) during fuel tank refilling operations and "running loss" (that is, fuel vaporized during vehicle operation). In one example, the adsorbent used is activated charcoal. Emissions control system 151 may further include a vent line 227 which may route gases out of the canister 222 to the atmosphere when storing, or trapping, fuel vapors from fuel system 218. Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake 244 is provided to the capless refueling system. While this example shows vent line 227 communicating with fresh, unheated air, various modifications may also be used. Flow of air and vapors between canister 222 and the atmosphere may be regulated by the operation of a canister vent solenoid (not shown), coupled to canister vent valve 229. For example, canister vent valve 229 may be normally open. During certain conditions, vent valve 229 may be closed to isolate the emission control system from the atmosphere.

The vehicle system 206 may further include a control system 214. Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device, temperature sensor 233, pressure sensor 237, and pressure sensor 291. Other sensors such as pressure, temperature, air/fuel ratio, and composition sensors may be coupled to various locations in the vehicle system 206, as discussed in more detail herein. As another example, the actuators may include fuel injector 266, valve 229, throttle 262, and valve 261. The control system 214 may include a controller 212. The controller may receive input data from the various sensors, process the input data, and trigger the actuators in response to the processed input data based on instruction or code programmed therein corresponding to one or more routines. Example control routines are described herein with regard to FIG. 3.

Emissions control system 151 operates to store vaporized hydrocarbons (HCs) from fuel system 218. Under some operating conditions, such as during refueling, fuel vapors present in the fuel tank may be displaced when liquid is added to the tank. The displaced air and/or fuel vapors may be routed from the fuel tank 220 to the fuel vapor canister 222, and then to the atmosphere through vent line 227. In this way, an increased amount of vaporized HCs may be stored in canister 222. During a later engine operation, the stored vapors may be released back into the incoming air charge using the intake manifold vacuum. Specifically, the canister 222 may draw fresh air through vent line 227 and purge stored HCs into the engine intake for combustion in the engine. Such purging operation may occur during selected engine operating conditions.

FIG. 3 shows an example method 300 for cleaning a capless refueling system using engine manifold vacuum. For example, if the evaporative emission control system 151 was leak free before a refueling event and became leaky after refueling, then this may indicate that contamination, such as dirt, salt, leaves, and/or other debris got between the capless flap and seat and caused the leak. Instead of relying on a special tool for manually cleaning the capless unit, the capless unit may be automatically cleaned using engine vacuum.

At 302, method 300 includes determining if a capless refueling system is in use. For example, method 300 may be used in a vehicle, such as vehicle 100 shown in FIG. 1, which includes a capless refueling system, such as capless refueling system 120. If a capless refueling system is in use at 302, then method 300 proceeds to 303.

At 303, method 300 includes determining if a purge event occurs. For example, a fuel vapor canister, such as canister 222, may be purged during engine operation during selected conditions. For example, canister 222 may be purged in response to an amount of fuel stored in the canister greater than a threshold valve. Purge conditions may further be based on engine operating conditions such as engine speed, engine load, an amount of vacuum available to the canister, etc. If a purge event occurs at 303, then method 300 proceeds to 305.

At 305, method 300 includes purging the canister. For example, fuel vapor canister 222 may be purged by opening vent valve 229 or maintaining vent valve 229 open and opening purge valve 261 so that engine vacuum may draw fuel vapors from canister 222 into the engine. After the purge is complete, purge valve 261 may be closed and vent valve 229 may be maintained opened.

However, if a purge event does not occur at 303, then method 300 proceeds to 304. At 304, method 300 includes determining if a refueling event has occurred. Determining that a refueling event has occurred may be based on an engine off condition, one or more sensors in the fuel system, a fuel level change or increase, etc. If a refueling event occurred at 304, then method 300 proceeds to 306.

At 306, method 300 includes determining if a leak is currently present and no leak was detected before the refueling event. For example, leak testing may be performed immediately prior to the refueling event by sealing off the evaporative emission control system and monitoring pressure changes with the system to determine if a leak is present. Following the refueling event, leak testing may again be performed to determine if a leak is detected following the refueling event. A leak introduced into the evaporative emission control system following refueling may indicate that contaminants were introduced into the capless unit during the refueling, e.g., via insertion of the nozzle into the capless unit. Thus, if no leak was detected prior to the refueling event and a leak is detected following the refueling event, then it may be desirable to clean the capless unit to remove the contaminants.

At 308, method 300 includes cleaning the capless refueling system using engine vacuum. Cleaning the capless refueling system using engine vacuum may occur during conditions when the fuel vapor canister is not being purged. For example, vacuum from an intake of the engine, e.g., intake manifold 244, may be provided to the capless refueling system in response to a leak detected in the capless refueling system following a refueling event. For example, the emission control system may be isolated from the atmosphere by closing a fuel vapor canister vent valve, e.g., valve 229, and opening a fuel vapor canister purge valve, e.g., valve 261, for a duration to supply engine vacuum to the capless unit during the duration.

In some examples, a length of the duration of providing engine vacuum to the capless unit may be a predetermined length of time. In other examples, a length of the duration may be based on engine operating conditions, e.g., based on engine speed, engine load, an amount of vacuum present in the intake of the engine, etc. For example, engine vacuum may be provided to the capless unit when an amount of vacuum in the intake of the engine is greater than a threshold value, e.g., greater than 20 InH2O, to ensure that sufficient vacuum is provided to the capless unit to open the capless flap so that air may be drawn into the capless unit from the atmosphere to pull containments into the fuel tank and clean the unit. For example, the engine vacuum may cause contaminants in the capless unit to be forced into the fuel tank and the capless unit would seal again. In some examples, the engine vacuum may be provided to the capless unit to periodically clean the unit during certain conditions, For example, engine vacuum may be provided to the capless unit to clean the unit on a maintenance periodic schedule.

At 310, method 300 includes determining if a leak is still present. For example, if, after attempting to clean the capless unit automatically using engine vacuum, a leak is still detected in the capless refueling system, then in some examples, engine vacuum may again be applied during increased engine vacuum conditions to attempt to dislodge the contaminants. Thus, for example, at 311 method 300 may include determining whether or not to retry cleaning the capless unit using engine vacuum. For example, cleaning using engine vacuum at 308 may be performed a plurality of times until a leak is not detected. Thus, if at 311 it is determined to retry cleaning the capless unit with engine vacuum then method 300 may proceed back to 306 to again provide vacuum to the capless unit from the engine and perform a subsequent leak test.

However, if a leak persists after attempting to clean with engine vacuum one or more times then it may be desirable to alert a vehicle operator to manually clean the capless unit, e.g., by using funnel 181 or some other tool. Thus, if a leak is still present at 310, and it is determined not to retry cleaning the capless unit at 311, then method 300 proceeds to 312.

At 312, method 300 includes alerting an operator to manually clean the capless refueling system. For example, in response to a leak detected after cleaning the capless refueling system using engine vacuum, a request may be generated and sent to a vehicle operator to manually clean the capless refueling system. For example, an alert may be displayed at a cluster in the vehicle to instruct the driver to insert a funnel or other tool into the capless unit to clear it of debris. In some examples, the capless unit may be monitored to determine if a manual cleaning event has occurred. For example, a manual cleaning event may be detected based on an engine start/stop condition and/or one or more sensors in the capless refueling system, e.g., a sensor coupled to a flap or sealing door in the capless unit.

At 314, method 300 includes determining if a leak is still present. For example, if a leak is still present even after engine vacuum was provided to attempt to clean contaminants from the capless unit and after an attempt was made by the vehicle operator to manually clean the capless unit, then the detected leak may indicate that there is a persistent leak in the capless unit. Thus, if a leak is still present at 314, method 300 proceeds to 316.

At 316, method 300 includes setting a diagnostic code to indicate a persistent leak. For example, in response to a leak detected after a duration following sending the manual cleaning request to the vehicle operator, a degradation of the capless refueling system may be indicated. For example, this degradation may be indicated after the capless refueling system is manually cleaned by the vehicle operator. For example, a manual cleaning event may be detected in the capless refueling system and in response to a leak detected after the manual cleaning event, a degradation of the capless refueling system may be indicated. For example, indicating a degradation of the capless refueling system may include setting a diagnostic code in an onboard diagnostic system of the vehicle so that maintenance may be performed.

FIG. 4 shows example engine operation graphs 402, 404, and 406 illustrating an example method, e.g., method 300 described above, for cleaning a capless refueling system using engine manifold vacuum. At 402, FIG. 4 shows engine operation, e.g., whether the engine is on or off, during leak testing, refueling, and capless unit cleaning. At 404, FIG. 4 shows the position of a vent valve, e.g., vent valve 229 positioned between fuel vapor canister 222 and the atmosphere, during leak testing, refueling, and capless unit cleaning. At 404, FIG. 4 shows the position of a purge valve, e.g., purge valve 261 positioned between fuel vapor canister 222 and an intake of the engine, during leak testing, refueling, and capless unit cleaning.

As shown in FIG. 4, the engine may be shut-down or turned off at time t0. However, before time t0, the engine may be in operation and the vent valve may be open and the purge valve may be closed. For example, the vent valve may be a normally open valve and the purge valve may be a normally closed valve during engine operation.

After the engine is shut-down at time t0, at time t1 leak testing may be performed on the fuel evaporative emission system. For example, at t1 the vent valve may be closed while the purge valve is maintained closed for a duration from time t1 to time t2 during which leak testing is performed. During this first leak testing event between time t1 and time t2, no leak may be detected. After the first leak testing event ends at t2, the vent valve may be adjusted to an open position while the purge valve remains closed. At a time t3 after time t2, a refueling event may occur. For example, while the engine is off, a vehicle operator may replenish fuel in the fuel tank at time t3. The refueling event may occur after the first leak test between t1 and t2 with no engine starts between time t2 and time t3. Immediately after the refueling event at time t4, a second leak test may be performed between time t4 and time t5. During the second leak test, the vent valve may be closed while the purge valve remains closed. Further, this second leak test may be performed prior to an engine start at time t6. For example, a leak may be detected by the second leak test.

After the second leak test ends at t5, the engine may be restarted at time t6. After the engine is restarted, while the engine is running at time t7, since a leak was not detected during the first leak test and a leak was detected by the second leak test following the refueling event, the capless unit may be cleaned using engine vacuum for a duration between time t7 and time t8. For example, at time t7 the vent valve may be adjusted to a closed positioned while the purge valve may be adjusted to an open position so that engine vacuum is provided to the capless unit for cleaning. After the capless unit cleaning event ends at time t8, vent valve may be opened and purge valve may be closed.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
in response to a leak detected following a refueling event in a vehicle with a chassis, wheels, an internal combustion engine, and a capless refueling system, cleaning the capless refueling system using vacuum by adjusting a valve to apply the vacuum to the capless refueling system, the adjusting the valve performed responsive to the leak detected following the refueling event, including opening a fuel vapor canister purge valve for a duration and closing a fuel vapor canister vent valve.

2. The method of claim 1, wherein cleaning the capless refueling system using vacuum is performed in response to no leak detected immediately prior to the refueling event and a leak detected following the refueling event.

3. The method of claim 1, further comprising, in response to a leak detected after cleaning the capless refueling system using vacuum, generating a request to a vehicle operator to manually clean the capless refueling system.

4. The method of claim 3, further comprising, in response to a leak detected after a duration following generating the request to the vehicle operator, indicating a degradation of the capless refueling system.

5. The method of claim 4, wherein indicating the degradation of the capless refueling system includes setting a diagnostic code in an onboard diagnostic system of the vehicle.

6. The method of claim 1, wherein the fuel vapor canister vent valve is positioned between a fuel vapor canister and the atmosphere and the fuel vapor canister purge valve is positioned between the fuel vapor canister and an intake of the engine, and further comprising, to detect the leak, closing the fuel vapor canister vent valve and closing the fuel vapor canister purge valve while the engine is off following the refueling event.

7. The method of claim 1, wherein cleaning the capless refueling system using vacuum is performed in response to a vacuum in an intake of the engine greater than a threshold, the threshold comprising a level of vacuum at which a capless flap of the capless refueling system is configured to open.

8. A method for a vehicle with an internal combustion engine and a capless refueling system, comprising:
providing vacuum from an intake of the engine to the capless refueling system by adjusting first and second valves in response to a leak detected in the capless refueling system following a refueling event, and in response to a leak detected after providing vacuum from the intake of the engine to the capless refueling system for a duration, sending a request to a vehicle operator to manually clean the capless refueling system.

9. The method of claim 8, wherein providing vacuum from the intake of the engine to the capless refueling system by adjusting the valves is performed in response to no leak detected prior to the refueling event and a leak detected following the refueling event.

10. The method of claim 8, wherein providing vacuum from the intake of the engine to the capless refueling system by adjusting the valves comprises opening a first fuel vapor canister purge valve for a duration and further comprises closing a second fuel vapor canister vent valve, wherein the second fuel vapor canister vent valve is positioned between a fuel vapor canister and the atmosphere and the first fuel vapor canister purge valve is positioned between the fuel vapor canister and the intake of the engine, and wherein fuel vapors from the fuel vapor canister are substantially not purged while providing vacuum from the intake of the engine to the capless refueling system in response to the leak detected in the capless refueling system following the refueling event.

11. The method of claim 8, further comprising, detecting a manual cleaning event in the capless refueling system and, in response to a leak detected after the manual cleaning event, indicating a degradation of the capless refueling system.

12. The method of claim 11, wherein indicating the degradation of the capless refueling system includes setting a diagnostic code in an onboard diagnostic system of the vehicle.

13. The method of claim 8, wherein providing vacuum from the intake of the engine to the capless refueling system by adjusting the first and second valves is performed in response to a vacuum in the intake of the engine greater than a threshold.

14. A method for a vehicle with an internal combustion engine and an emission control system, comprising:
in response to a leak detected in a capless refueling unit coupled to the emission control system following a refueling event, isolating the emission control system from the atmosphere and providing vacuum to the capless refueling unit for a duration, the vacuum provided by adjusting first and second valves responsive to detecting the leak, wherein isolating the emission control system from the atmosphere includes closing a fuel vapor canister vent valve and opening a fuel vapor canister purge valve.

15. The method of claim 14, wherein isolating the emission control system from the atmosphere and providing vacuum to the capless refueling unit for the duration is performed in response to no leak detected prior to the refueling event and a leak detected following the refueling event.

16. The method of claim 14, further comprising, in response to a leak detected after the duration, sending a request to a vehicle operator to manually clean the capless refueling unit.

* * * * *